Patented Nov. 29, 1932

1,889,427

UNITED STATES PATENT OFFICE

BARNETT SURE, OF FAYETTEVILLE, ARKANSAS

CONCENTRATION OF VITAMINS

No Drawing.    Application filed March 19, 1930.    Serial No. 437,272.

The present invention relates to the preparation and purification of vitamin concentrates from crude or impure extracts or concentrates. It has particular reference to the vitamins generally designated as the B-type.

The invention contemplates those steps which are applied to crude extracts, however they may be obtained. Vitamins are so obtained or extracted that they are associated with impurities which contaminate them and which in some instances mitigate against their use for various reasons. It is not an easy matter to remove these impurities from association with the vitamin, at the same time preserving the vitamin from injury or destruction, and to produce useful, palatable and potent concentrates.

One object of the present invention is to separate vitamins from associated impurities by a selective adsorption on an adsorbent, and then to recover the adsorbed vitamin from the adsorbent.

Still another object of the invention is to so prepare an extract for adsorption that it may be treated directly with the adsorbing agent.

Various other objects and advantages of the invention will be apparent from the following discussion and description of the invention, and from the specific illustration of the preferred manner of carrying it out in actual practice.

It is known that adsorbents, like active carbon, silica gel, etc., have the power of selectively adsorbing vitamins from mixtures containing them. The extent of the adsorption is a maximum at some specific range of hydrogen ion concentration. The specific range is not fixed, and may vary with the kind or quality of adsorbent, and/or with the kind or quality of extract and impurities involved in the adsorption process. In each instance it will be necessary to determine the optimum hydrogen ion concentration for maximum adsorption for the specific materials involved. The aim is to expose the material under optimum conditions for selective adsorption, separation of the adsorption complex from the impurities, and subsequent release or recovery of the adsorbed vitamin from the adsorbent. The latter is effected by exposure of the adsorption complex to conditions not favorable to adsorption of the vitamin on the adsorbent.

The crude extract to be treated may contain impurities which are adsorbed in preference to the vitamins, and in such a case it is necessary to remove such impurities from the vitamins before a selective concentration may be effected by adsorption. The character of these impurities will depend upon the source of the vitamin, and on the method employed for making the crude extract from said source or in subsequently treating the vitamin derived therefrom.

I have found that a very general treatment of crude vitamin B extract may be practiced prior to the adsorption concentration, giving by adsorption a highly efficient selection of vitamin from impurities, and a highly potent recovered extract. I dissolve the crude extract in an organic solvent for the vitamin, and then dilute with another solvent which forms a mixed solvent capable of dissolving the vitamin, and incapable of dissolving some of the impurities associated with the vitamin, such as those which interfere with the selective adsorption, although I am not able to state the nature of these impurities any more than I am able to state the nature of the vitamin. Specifically, I employe glacial acetic acid as the solvent for the crude extract, and use acetone, as a dilutent for that solvent. Then I separate from the mixed solvent containing the vitamin, the solid insoluble impurities. The vitamin solution is then treated to separate the vitamin from the solvent without destruction of the vitamin. This may be done by low temperature distillation, as under a vacuum, to form a crude residue of vitamin. This residue is then subjected to the adsorption purification.

Generally the adsorption purification is accomplished by diluting the residue, or if other extracts are employed, by diluting the extract containing the vitamin, with water, then, adjusting the hydrogen ion concentration of the aqueous solution to the optimum range for the materials involved. This adjustment may be made with suitable alkali or acid materials or buffer salts, as is well known in the art of chemistry. To the adjusted aqueous solution I add the adsorbent which is selective to the vitamin, such as active carbon. The mass is mixed and allowed to come to an equilibrium condition of adsorption. Then I filter the liquid from the adsorbent containing the vitamin. The adsorbent and the bound vitamin are then treated to release the vitamin.

The process may be carried out as follows: A crude extract of vitamin B may be secured by known methods from rice polishing, which is the basic material selected herein for the specific purpose of illustrating the nature of the invention. Other natural sources of vitamin may also be used. I have determined that when a commercial active carbon known as "Norite", and generally available on the market, is employed for the adsorption, and a vitamin B extract from rice polishings is employed, the optimum hydrogen ion concentration for adsorption is at about pH 4 to pH 5. In the case of vitamin B from yeast the optimum hydrogen ion concentration is about pH 7. Vitamin B from the wheat embryo requires an optimum concentration of pH 4 to pH 5, like that from rice polishings.

Taking about 700 grams of rice polishings as a basic for the amount of extract concerned with the following procedure, I treat a crude concentrated extract therefrom with about 700 cc. of glacial acetic acid at room temperature. Then I add about 4200 cc. of anhydrous acetone as a diluent forming a mixed solvent in which some solid impurities appear. These are separated from the solution, and the solution is treated to recover vitamin therefrom. The solids may be washed with acetone, and the washings added to the bulk of the vitamin solution.

The separation of the vitamin from the solvent may be effected by a distillation under conditions which do not injure the vitamin. A low-temperature is suitable and may be conducted as follows: The solvent and contents are distilled in vacuo, first to remove acetone portions, and later to remove acetic acid portions. The acetone being more volatile may be boiled off under a vacuum of 200 mm. to 250 mm. of mercury pressure at a temperature of from 30° C. to 40° C. Two and one-half to three hours may be consumed in this operation without destroying the vitamin content. Next the vacuum is increased and the temperature raised to remove acetic acid. This may be done at a temperature of from 40° C. to 70° C. and a mercury pressure of from 50 mm. to 75 mm.

Three hours may be consumed in this operation without destroying the vitamin content. The residue is a viscous product and may contain from 10% to 15% acetic acid which is best not removed by distillation. To push the distillation too hard might destroy the vitamin content. Acid exerts a preservative influence on the material, and it strongly holds the acid to itself. The greater part of the residual acid is dissipated in a current of warm air under atmospheric pressure.

The residue may be used directly for the adsorption purification. It may be diluted with about 350 cc. of water, and its hydrogen ion concentration adjusted in a known manner to secure the measure of pH 5 to pH 4. Alkali may be added if the dilution is too acid, that is, at a pH less than 4. To the adjusted solution, I add about 20 grams of active carbon, such as the "Norite" charcoal referred to. This may be previously purified for the occasion by washing it with a 5% solution of hydrochloric acid, and then with distilled or clean water until it is free from a test for chlorides. The carbon may be agitated in the liquid for about 15 minutes which is sufficient time for the selective adsorption to take place. This may be practiced at room temperature. The carbon and the liquid are then separated, the carbon being saved as the container of the vitamin. The liquid may be saved for recovery of unadsorbed vitamin therein if desired. The carbon may be washed with 50 to 100 cc. of 90% to 95% (by volume) ethyl alcohol, and the alcohol added to the liquid from the carbon. The carbon is then subjected to a treatment which effects release of the vitamin from the adsorption complex. It may be washed twice with about 200 cc. of tenth normal hydrochloric acid, followed by two extractions with 200 cc. of 25% (by volume) ethyl alcohol. The acid and the dilute alcohol filtrate now contain the vitamin. These may be combined and subjected to a distillation process in vacuo, as at 50 mm. to 75 mm. mercury pressure at a temperature not exceeding 70° C. A dark brown gummy solid of about 3.4 grams will result. This contains about 65% of all the vitamin B of the extract treated for adsorption, and is present in about a tenfold concentration.

Biological tests have indicated the concentrate to be 5,000 times as potent as cow's milk. Calculation from its potency show that 1 pound of the extract will contain at least 600,000 Sherman units of vitamin B. It is very soluble in water, not unpalatable when its acid is neutralized, and it is so potent that its palatability is a negligible factor.

It will of course be understood that numerous variations and modifications of the process may be practiced, and that I do not intend to limit the invention strictly to the proportions and procedure given herein by way of illustrating the nature of the invention. All those changes and modifications that fall within the scope of the appended claims are contemplated as falling within the scope of the invention as I hereby aim to disclose and claim the same.

I claim:

1. The method of making a vitamin concentrate which comprises treating a crude vitamin B extract with glacial acetic acid, adding acetone as a diluent to form a mixed solvent capable of dissolving the vitamin and incapable of dissolving some impurities in said crude extract, removing the vitamin solution from the solid impurities, volatilizing the acetic acid and acetone at a temperature not destructive of the vitamin, suspending the residue in water, adjusting the hydrogen ion concentration to permit selective adsorption of the vitamin by adsorbent carbon, adding adsorbent carbon at said hydrogen ion concentration, separating the carbon containing the vitamin from the liquid, washing the vitamin from the carbon first with hydrochloric acid and then with alcohol, combining the two washing liquids, and volatilizing the liquid from the vitamin.

2. The method of purifying a vitamin B which comprises subjecting a solution containing vitamin B and impurities to the selective adsorption of the vitamin by an active carbon at a hydrogen ion concentration favoring selective adsorption, separating the carbon containing the vitamin from the liquid, washing the carbon with a dilute hydrochloric acid solution, washing the carbon thereafter with a dilute alcohol solution, and mixing and volatilizing the acid and the alcohol at a temperature which is not destructive to the vitamin to form a residual vitamin concentrate.

In witness whereof I hereby affix my signature.

BARNETT SURE.